US012320191B2

(12) United States Patent
Zwierzykowski

(10) Patent No.: US 12,320,191 B2
(45) **Date of Patent: *Jun. 3, 2025**

(54) ARTICULATING EXPANDABLE BARRIER

(71) Applicant: Peter Zwierzykowski, San Diego, CA (US)

(72) Inventor: Peter Zwierzykowski, San Diego, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 18/297,953

(22) Filed: Apr. 10, 2023

(65) Prior Publication Data

US 2023/0392437 A1 Dec. 7, 2023

Related U.S. Application Data

(63) Continuation of application No. 17/149,193, filed on Jan. 14, 2021, now Pat. No. 11,649,667, which is a continuation of application No. 16/595,918, filed on Oct. 8, 2019, now Pat. No. 10,920,485, which is a continuation of application No. 15/606,860, filed on May 26, 2017, now Pat. No. 10,472,883.

(60) Provisional application No. 62/343,627, filed on May 31, 2016.

(51) Int. Cl.
*E06B 9/00* (2006.01)
*E06B 9/06* (2006.01)

(52) U.S. Cl.
CPC .............. *E06B 9/00* (2013.01); *E06B 9/0615* (2013.01); *E06B 2009/002* (2013.01); *E06B 9/0623* (2013.01); *E06B 9/063* (2013.01)

(58) Field of Classification Search
CPC ...... E06B 9/00; E06B 2009/002; E06B 9/063; E06B 9/0615
See application file for complete search history.

(56) References Cited

U.S. PATENT DOCUMENTS

| | | | |
|---|---|---|---|
| 67,143 | A | 7/1867 | Snead |
| 351,084 | A | 10/1886 | Wilson |
| 417,898 | A | 12/1889 | Bataille |
| 514,663 | A | 2/1894 | Pitt |
| 685,247 | A | 10/1901 | Borrman |
| 763,604 | A | 6/1904 | Guerin |

(Continued)

FOREIGN PATENT DOCUMENTS

| | | | |
|---|---|---|---|
| WO | 9638647 | A1 | 12/1996 |
| WO | 2012107335 | A1 | 8/2012 |

OTHER PUBLICATIONS

Barrier Group (2015) "Port-A-Guard Maxi-Expandable Barriers", Brochure, 4 Pages.

(Continued)

*Primary Examiner* — Basil S Katcheves

(74) *Attorney, Agent, or Firm* — Mintz Levin Cohn Ferris Glovsky and Popeo, P.C.

(57) ABSTRACT

Provided is an adjustable barrier having a central hinge having a cylindrical post and an axis of rotation; a first expandable section coupled to the cylindrical post of the central hinge by at least a first connector; and a second expandable section coupled to the cylindrical post of the central hinge by at least a second connector. At least one of the first and second expandable sections is configured to articulate around the axis of rotation of the central hinge forming an articulation angle between the first and second expandable sections.

16 Claims, 17 Drawing Sheets

(56) References Cited

U.S. PATENT DOCUMENTS

| | | | | |
|---|---|---|---|---|
| 871,905 | A | 11/1907 | Acers | |
| 936,812 | A | 10/1909 | Robinson | |
| 2,348,561 | A | 5/1944 | Mutch | |
| 3,145,766 | A * | 8/1964 | Wickham | E01F 13/02 160/136 |
| 3,297,076 | A | 1/1967 | Albert | |
| 3,499,398 | A | 3/1970 | Murray | |
| 3,605,851 | A | 9/1971 | Miles et al. | |
| 4,053,079 | A | 10/1977 | Karpisek | |
| 5,282,606 | A | 2/1994 | Praiss | |
| 5,515,899 | A | 5/1996 | Chan | |
| 5,704,592 | A * | 1/1998 | White | E01F 13/022 256/25 |
| 5,850,922 | A | 12/1998 | Fraser | |
| 5,860,250 | A * | 1/1999 | Hill | E06B 9/02 49/55 |
| 6,675,723 | B2 | 1/2004 | Sukeva | |
| 6,783,012 | B2 | 8/2004 | Webb | |
| 7,971,733 | B2 | 7/2011 | Ponto | |
| 8,863,811 | B2 | 10/2014 | Yates et al. | |
| D732,259 | S * | 6/2015 | Lockwood | D34/26 |
| 10,472,883 | B2 * | 11/2019 | Zwierzykowski | E06B 9/0615 |
| 10,920,485 | B2 | 2/2021 | Zwierzykowski | |
| 11,649,667 | B2 | 5/2023 | Zwierzykowski | |
| 2003/0197165 | A1 | 10/2003 | Perelli | |
| 2004/0079930 | A1 | 4/2004 | Aubin | |
| 2006/0076544 | A1 | 4/2006 | Kurple | |
| 2007/0245631 | A1 | 10/2007 | Yi | |
| 2009/0241809 | A1 | 10/2009 | Head | |
| 2010/0083577 | A1 * | 4/2010 | Flannery | E06B 9/0615 49/130 |
| 2011/0162280 | A1 | 7/2011 | Yu | |
| 2012/0285099 | A1 * | 11/2012 | Yates | E06B 9/0623 49/503 |
| 2017/0342768 | A1 | 11/2017 | Zwierzykowski | |
| 2020/0032579 | A1 | 1/2020 | Zwierzykowski | |
| 2021/0381307 | A1 | 12/2021 | Zwierzykowski | |

OTHER PUBLICATIONS

Cisco (2016) “Mobile Barrier Gate 6' Wide Adder”, Retrieved from:www.cisco-eagle.com/catalog/product/182891/mobile-barrier-gate-6-wide-adder, 7 Pages.

Desimone (2016) “Barrier Gates, Collapsible Gates, Door Gates, Folding Gates, Steel Folding Gates”, Retrieved from: www.bondorseals.com/more_info/galvanized_barrier_gates/galvanized_barrier_gates.htm, 3 Pages.

No Author (2016) “Low Portable Folding Steel Security Gates—a.k.a. Scissor or Accordion Gates”, Blockader Gates, Retrieved from: blockadergates.com/low-portable-folding-steel-security-gates/.

Pinterest, (2017) “Folding Security Gates”, Retrieved from: www.pinterest.com/xinger3988/folding-security-gates/, 7 Pages.

Portable Gates (2007) “Portable Security Gates, Gates Roll Away When Not in Use”, Heavy-Duty Portable Security Gates, 2 Pages.

* cited by examiner

ARTICULATING EXPANDABLE BARRIER

CROSS-REFERENCE TO RELATED APPLICATIONS

The present application is a continuation of U.S. application Ser. No. 17/149,193, filed Jan. 14, 2021, which is a continuation of U.S. application Ser. No. 16/595,918, filed Oct. 8, 2019, now U.S. Pat. No. 10,920,485, which is a continuation of U.S. application Ser. No. 15/606,860, filed May 26, 2017, now U.S. Pat. No. 10,472,883, which claims priority to U.S. Provisional Patent Application Ser. No. 62/343,627, filed May 31, 2016, entitled "Articulating Expandable Barrier," the full disclosures of which are incorporated herein by reference.

FIELD

The subject matter described herein relates to expandable barriers having portions that articulate relative to one another via a hinge.

BACKGROUND

Temporary barriers are often used to delineate an area against vehicle or personal entry often incorporate lattice type structure capable of expanding in the vertical plane.

SUMMARY

In some aspects there are provided systems, devices, and methods for temporarily and/or customizably providing barrier function.

In some aspects, there is provided an adjustable barrier having a central hinge having a cylindrical post and an axis of rotation; a first expandable section coupled to the cylindrical post of the central hinge by at least a first connector; and a second expandable section coupled to the cylindrical post of the central hinge by at least a second connector. At least one of the first and second expandable sections is configured to articulate around the axis of rotation of the central hinge forming an articulation angle between the first and second expandable sections.

The cylindrical post can extend upright between the first and second expandable sections. The first connector and the second connector each can include a generally tubular knuckle and a leaf extending laterally from the knuckle. Each knuckle can have an inner diameter sized to receive an outer diameter of the cylindrical post such that the knuckle is received over the cylindrical post. Each leaf can be configured to couple to its respective expandable section. The articulation angle can be between 0 degrees at which the first and second expandable sections is folded over completely against one another to about 180 degrees at which the first and second expandable sections are unfolded relative to one another and extend within a single vertical plane.

The barrier can further include a hinge lock configured to engage the first and second expandable sections when the first and second expandable sections are aligned within a single vertical plane thereby preventing articulation around the axis of rotation. The hinge lock can include a tubular region and a locking region extending upward from the tubular region. The tubular region can have an outer diameter sized to insert within an inner diameter of the cylindrical post. The first and second slots can extend through a full thickness of the locking region on opposing lateral sides towards a center of the locking region. When the tubular region of the hinge lock is received within the cylindrical post at least a portion of an upper edge of a respective one of the first and second expandable sections can extend through the first and second slots fixing the first and second expandable sections relative to one another preventing articulation around the central hinge. The hinge lock can be removeable from the barrier. The hinge lock can further include a tether coupled to a region of the hinge lock and to a region of the barrier. The barrier can be free-standing. The barrier can include a first footing coupled to a lower end of the first expandable section, a second footing coupled to a lower end of the second expandable section, and a third footing coupled to a lower end of the cylindrical post. At least one of the first, second, and third footings can be removable from the barrier. At least one of the first, second, and third footings can incorporate casters. The first expandable section can include a first multiplicity of slats hingedly interconnected in a scissoring lattice-type structure configured to expand outward from a compact, collapsed narrow configuration to an expanded, wide configuration. The second expandable section can include a second multiplicity of slats hingedly interconnected in a scissoring lattice-type structure configured to expand outward from a compact, collapsed narrow configuration to an expanded, wide configuration. The barrier can include a third expandable section coupled to the second expandable section by a second hinge.

DETAILED DESCRIPTION

Figure 1:
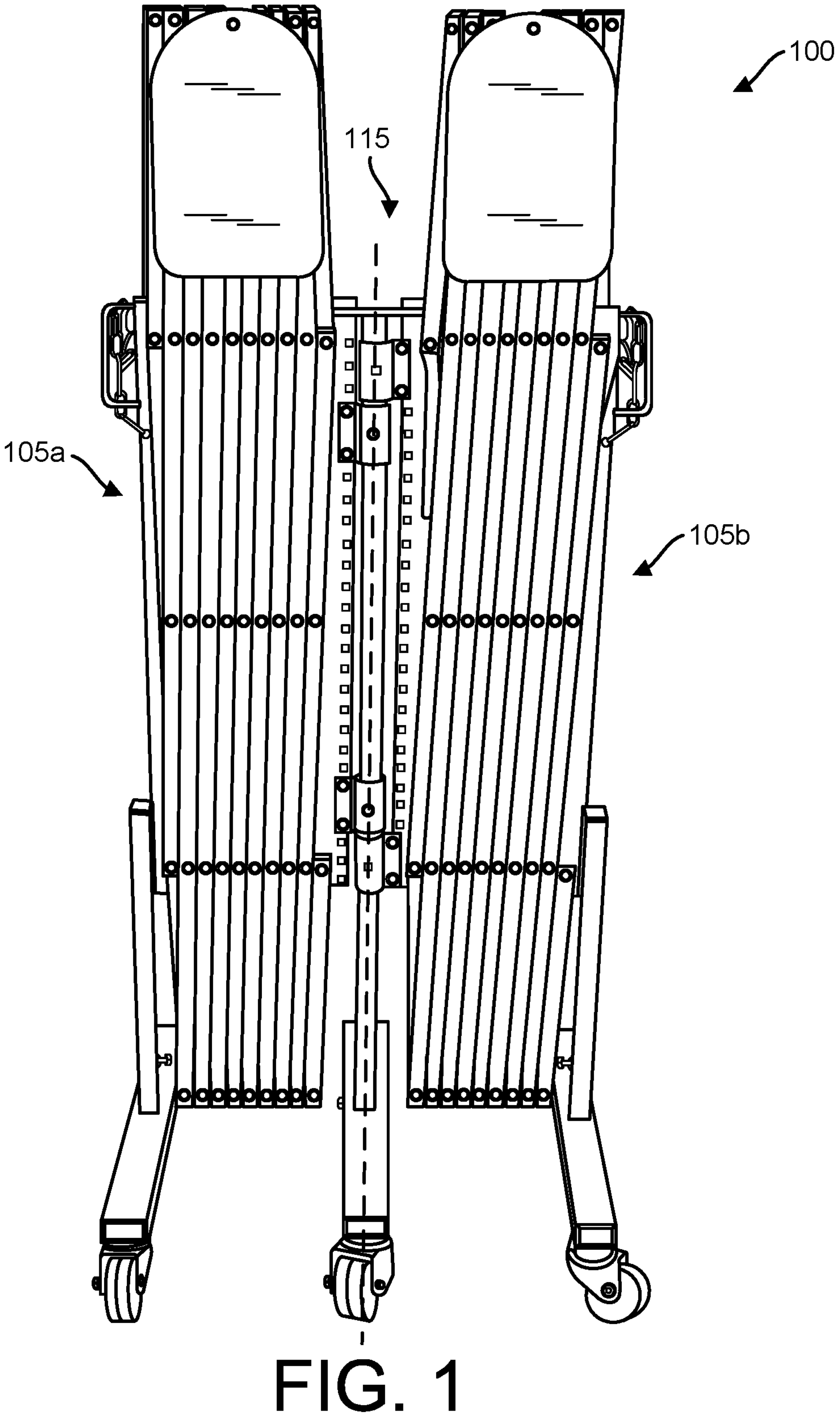
FIG. 1 is an implementation of the barrier in a collapsed configuration.

Described herein are temporary barriers that are expandable and collapsible in the vertical plane that also incorporate a hinge allowing for articulation of the expandable/collapsible portions relative to one another providing more flexibility. The temporary barriers described herein are particularly useful to block off a defined portion of an area, such as a portion of an aisle in a retail establishment.

It should be appreciated that although the barriers herein are described in the context of their use for safety, the barriers are usable for any number of purposes. In some implementations, the barriers described herein are usable for marking out a ground or floor area in which there is a safety hazard or in which maintenance or repair work is being carried out. In particular, the barriers described herein are useful in retail aisles where only a portion of the width of the aisle is barricaded and the remainder of the width of the aisle is open to the flow of traffic. The barriers described herein can be used for both outdoor and indoor applications. In some implementations, the barriers described herein are useful for indoor areas including residential buildings, retail buildings such as shopping malls, or warehouse "box" stores, other public venues such as maintenance locations, sporting venues, and other public venues or locations. It should also be appreciated that relative, directional language and terms regarding orientation such as "right," "left," "upper," "lower," "inner," "outer," "backward," "forward," "upward," "downward," "inward," "outward" and the like are used throughout merely for convenience for description and are not intended to be limiting.

Turning to the drawings, FIGS. 1-4 illustrate a first implementation of a temporary barrier 100. The barrier 100 can incorporate at least a first expandable section 105*a* coupled to at least a second expandable section 105*b* by a central hinge 115 allowing for the expandable sections to articulate relative to one another around an axis of rotation A. The axis of rotation A can extend through a cylindrical post of the central hinge 115.

The expandable sections 105*a*, 105*b* can incorporate a multiplicity of slats 120 hingedly interconnected in a scissoring lattice-type structure as is known in the art. It should be appreciated that a variety of expandable structure configurations are considered herein so long as the expandable sections are readily expanded outward from a compact, collapsed narrow configuration shown in FIG. 1 to an expanded, wide configuration shown in FIG. 4. In the narrow configuration edges of the slats 120 can abut one another such that each of the slats 120 extends generally parallel to one another and perpendicular to the floor. In the expanded, wide configuration the edges of the slats 120 are separated from one another forming an open lattice structure to achieve a maximum extension. It should be appreciated that although the barrier 100 shown in the figures incorporated an open lattice that the barriers described herein can also incorporate a closed structure such that the space between the slats 120 is covered by a material such as a fabric, plastic, or other material. Also, the relative thickness of each of the slats 120 can vary providing differing degrees of privacy and protection on either side of the barrier 100. It should also be appreciated that the barrier 100 may include more than two expandable sections 105, including 3, 4, 5 or more sections configured to be pivotably attached to one another for creating an enlarged space of various geometries. Further, the materials, weights, and overall size of the barrier components described herein can vary to satisfy different user preferences, such as more robust, heavy-duty metal materials for some implementations and less robust, lighter-weight, plastic materials for other implementations.

As mentioned above, the first expandable section 105*a* articulates relative to the second expandable section 105*b* around the central hinge 115 axis of rotation A forming an articulation angle between the first and second expandable sections. The central hinge 115 can include at least a first connector 125*a* coupled to the first expandable section 105*a* and at least a second connector 125*b* coupled to the second expandable section 105*b*. The central hinge 115 can also include a cylindrical post 130 extending upright between the first and second expandable section 105*a*, 105*b* that is configured to couple to each of the connectors 125*a*, 125*b* forming the hinge 115 (see FIG. 5). The axis of rotation A extends through a center of the cylindrical post 130.

Figure 5:
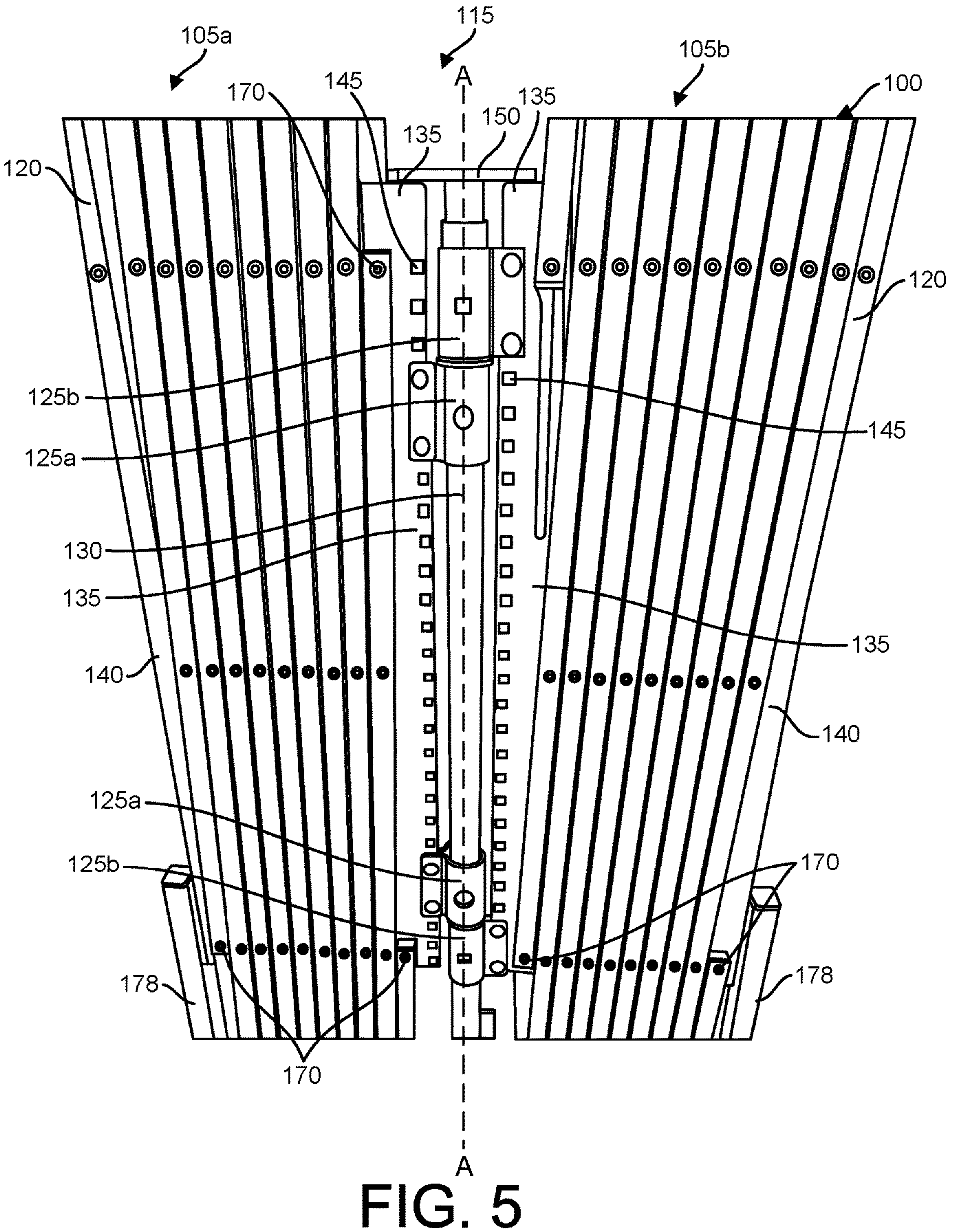
FIG. 5 is a close-up view of the barrier of FIG. 1.

Each expandable section 105 includes at least one connector 125, but can incorporate more than one connector 125. For example, each expandable section 105*a*, 105*b* can include two connectors 125 such that there are two connections points or hinge elements formed between the expandable sections 105*a*, 105*b*. FIG. 5, for example, shows one hinge element formed near a lower end of the barrier 100 and a second hinge element formed near an upper end of the barrier 100, each hinge element incorporating first and second connectors 125*a*, 125*b* and at least a region of the cylindrical post 130. The connector 125*a* of the first expandable section 105*a* can be positioned on the post 130 such that its lower edge 132 is adjacent an upper edge 133 of the connector 125*b* of the second expandable section 105*b* forming an articulating hinge element near a lower end region of the barrier 100. Another connector 125*a* of the first expandable section 105*a* can be positioned on the post 130 such that its upper edge 133 is adjacent a lower edge 132 of the connector 125*b* of the second expandable section 105*b* forming an articulating hinge element near an upper end region of the barrier 100. In other implementations, the connectors 125*a* of the first expandable section 105*a* interdigitate with the connectors 125*b* of the second expandable section 105*b*. It should be appreciated that the relative number and arrangement of connectors 125 can vary. It should be appreciated that although the central hinge 115 is described as having a particular mechanical configuration herein that other configurations of hinges are considered herein including, but not limited to a barrel hinge, butt hinge, flush hinge, continuous hinge, piano hinge, etc.

Figure 6:
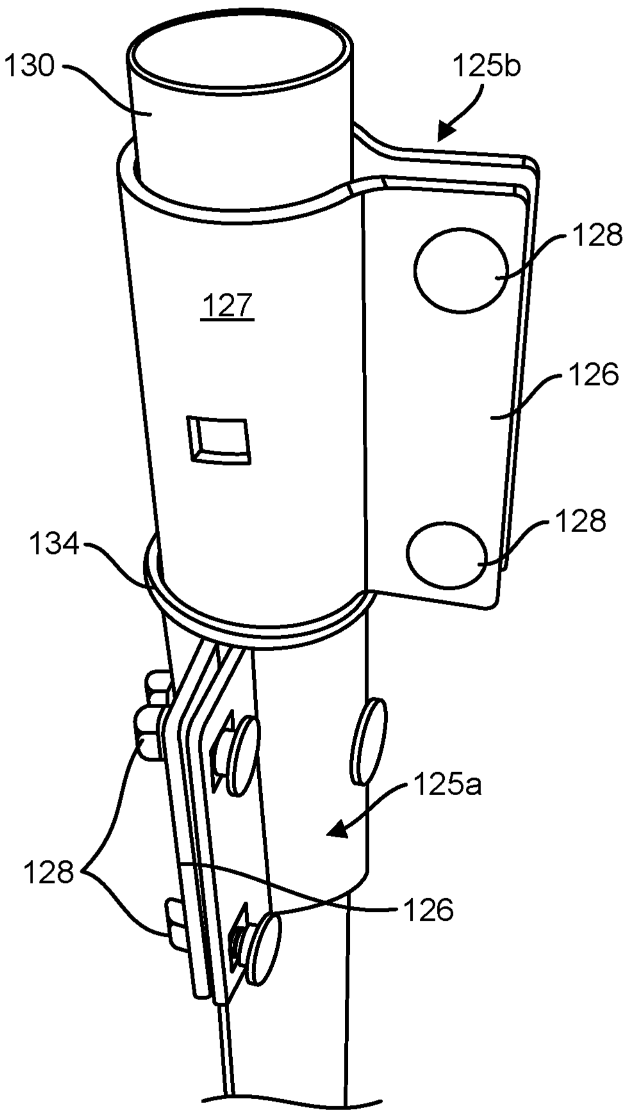
FIG. 6 is a detailed view of a portion of the barrier of FIG. 1.
Figure 7:
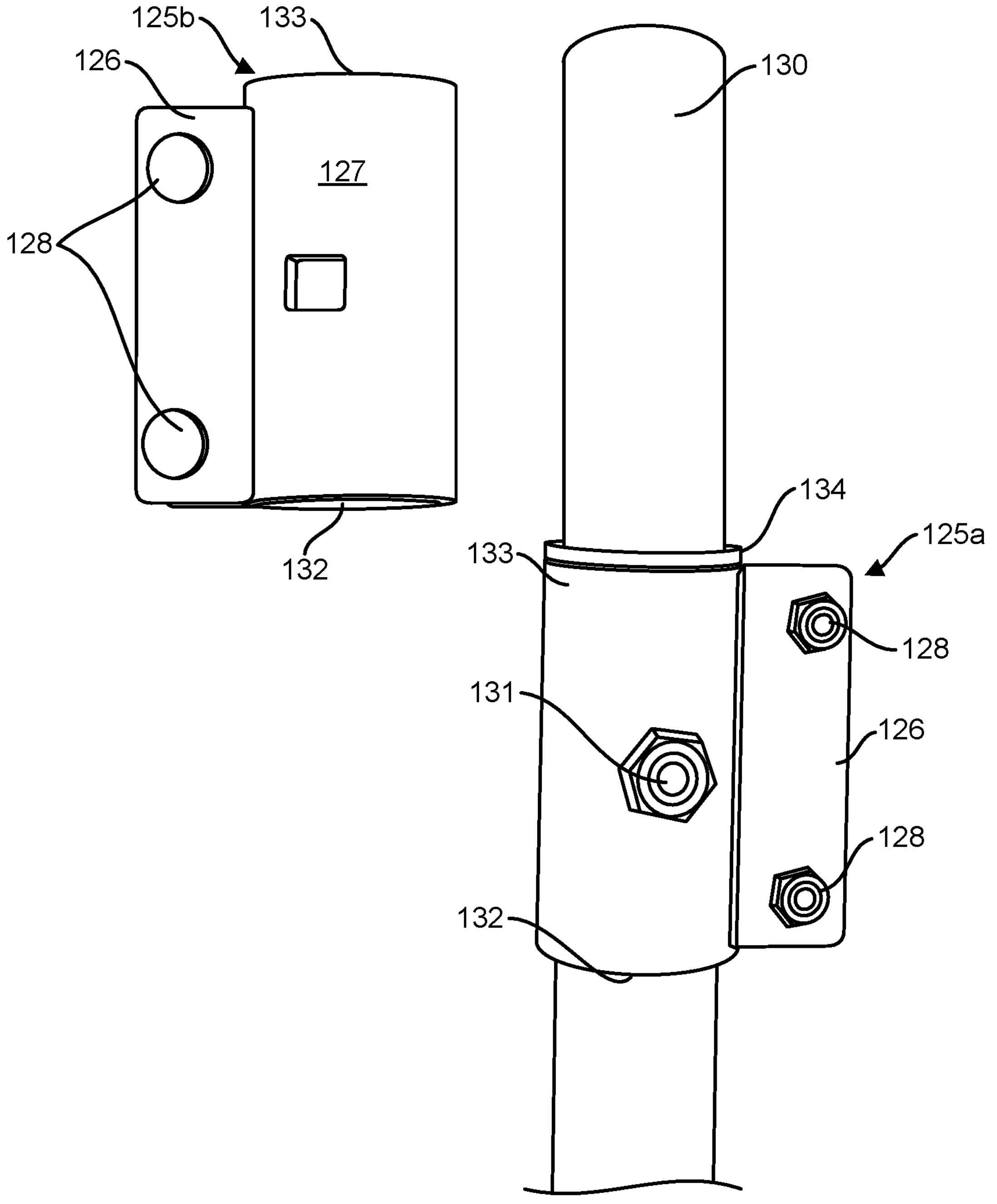
FIG. 7 is a partially exploded view of the portion of FIG. 6.
Figure 8:
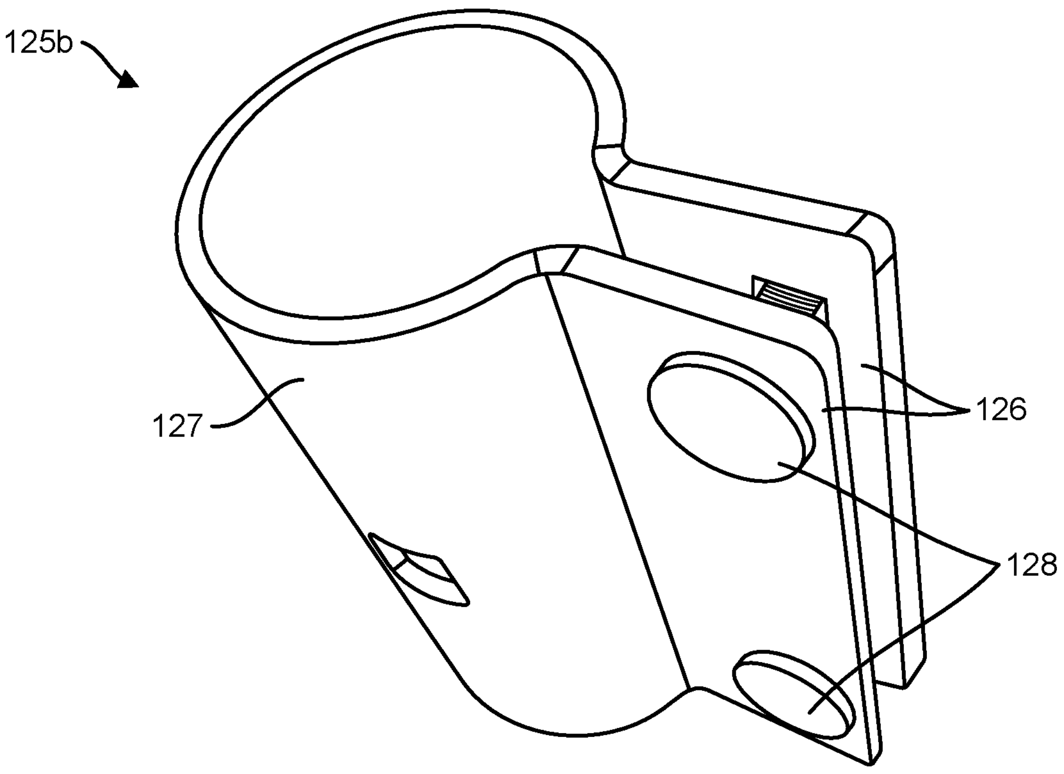
FIG. 8 is a perspective view of a connector from FIG. 6.
Figure 9:
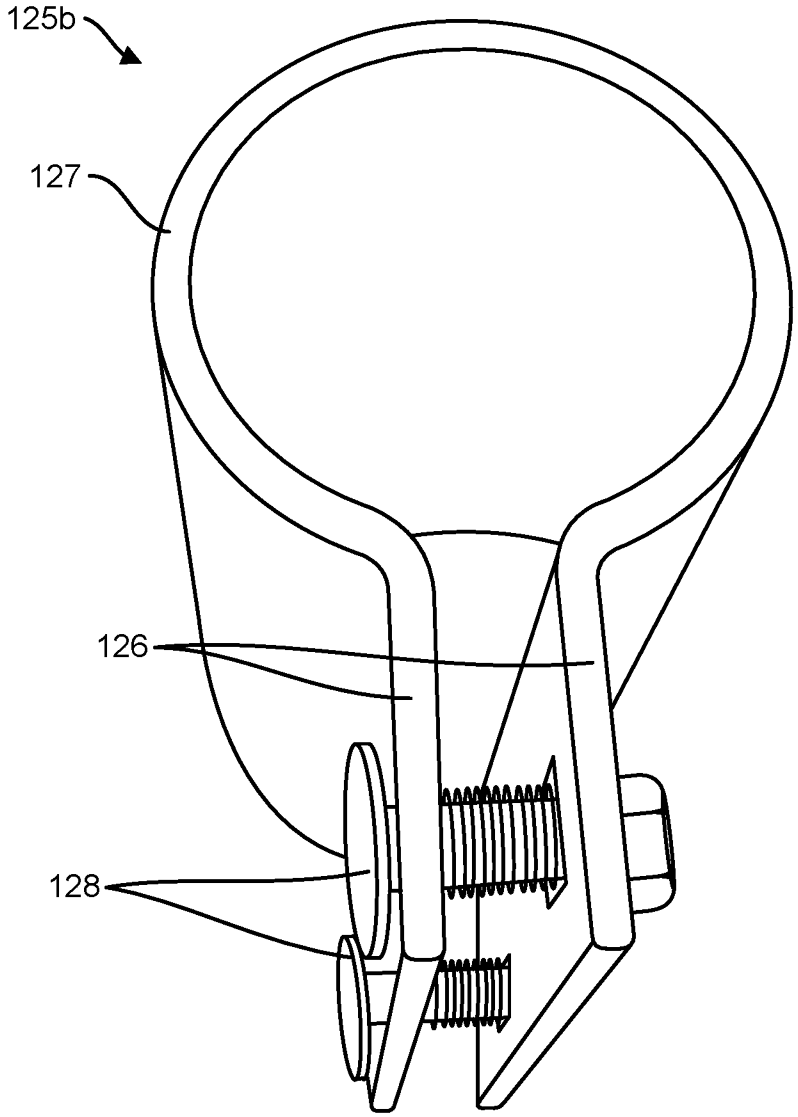
FIG. 9 is a top perspective view of the connector from FIG. 8.
Figure 10:
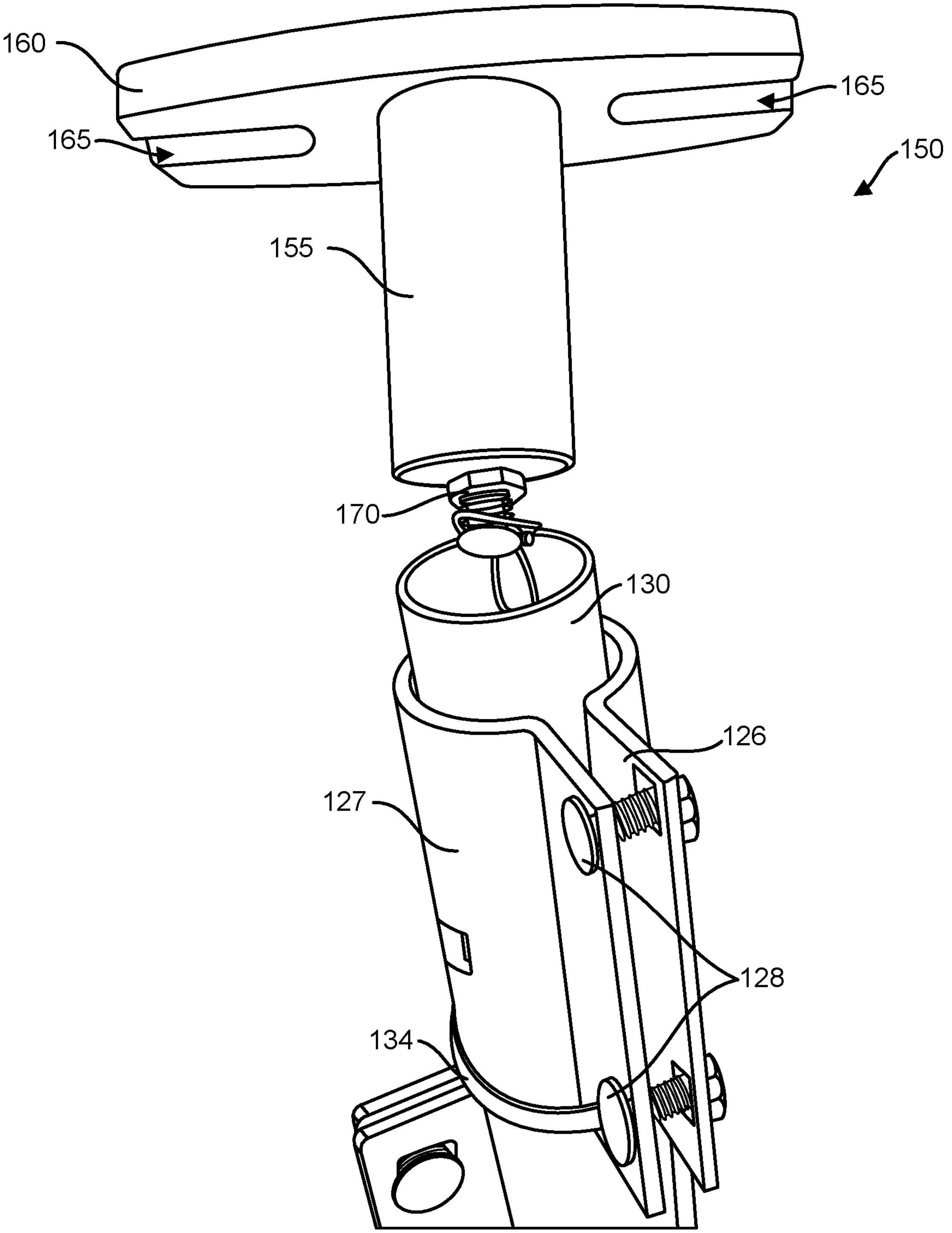
FIG. 10 is a partially exploded view of a portion of the barrier of FIG. 1.
Figure 11:
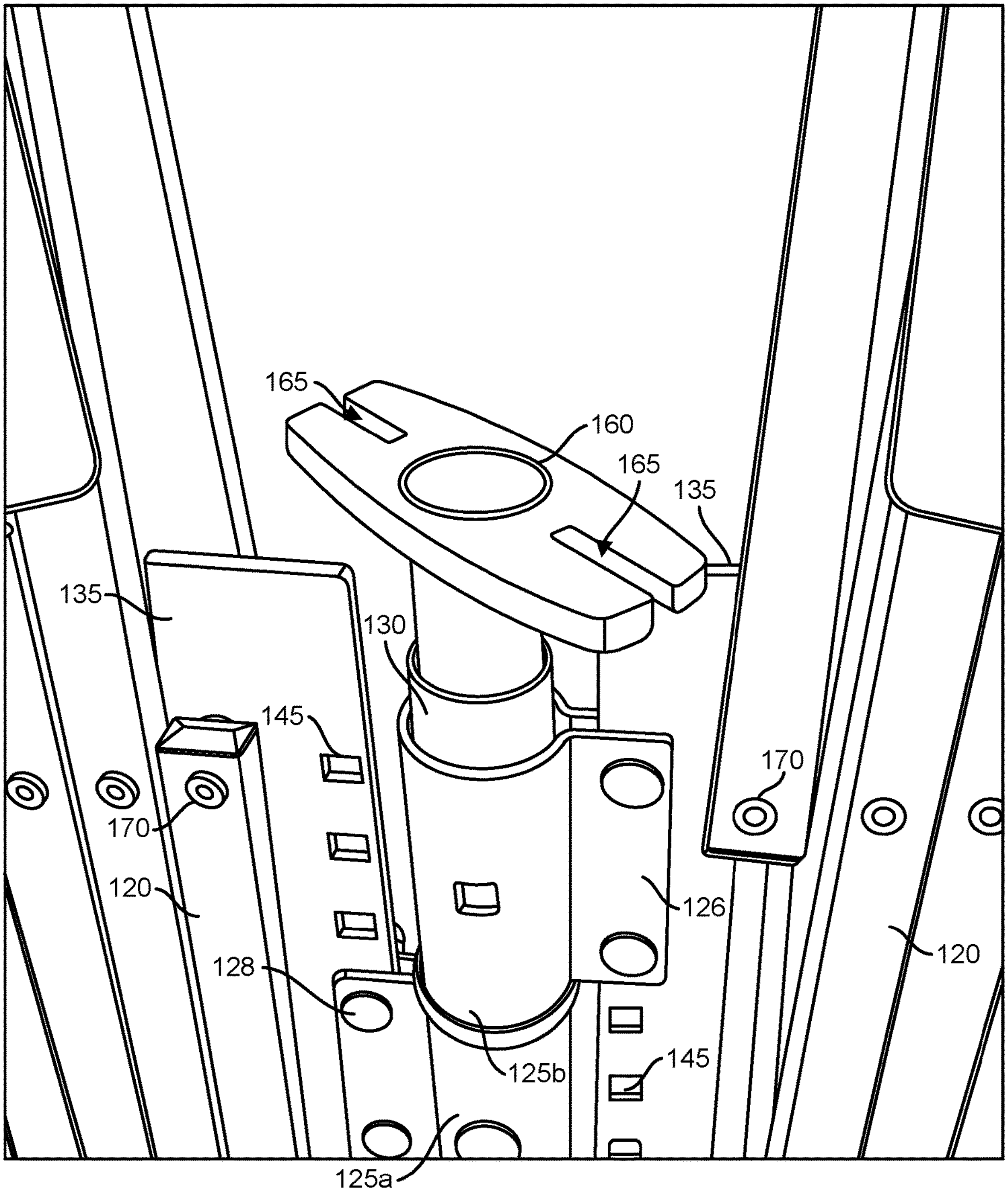
FIG. 11 is a detailed view of a portion of the barrier of FIG. 1 showing the hinge lock.
Figure 12:
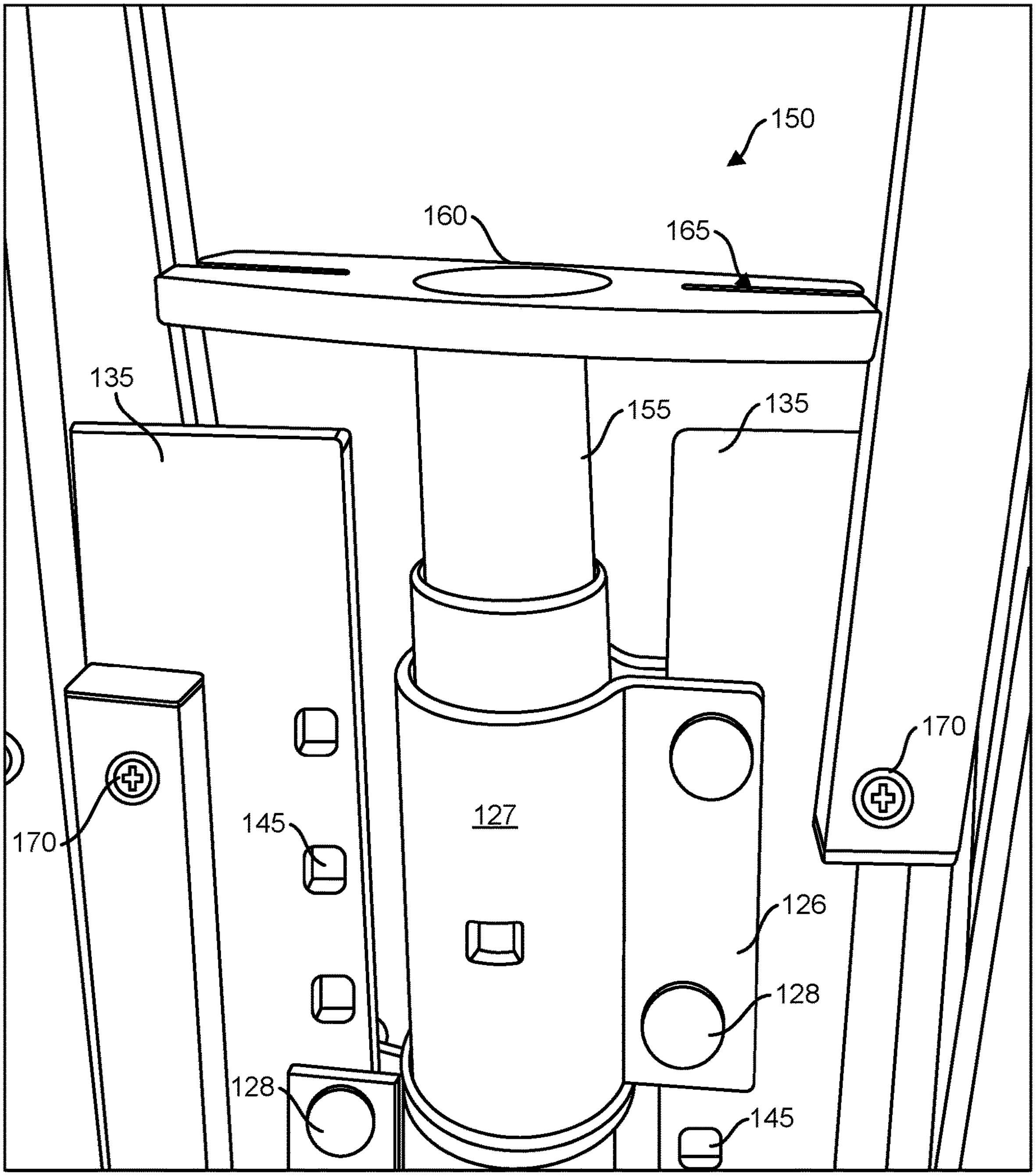
FIG. 12 is a detailed view of the portion of the barrier of FIG. 1 showing the hinge lock in a first, unlocked configuration.
Figure 13:
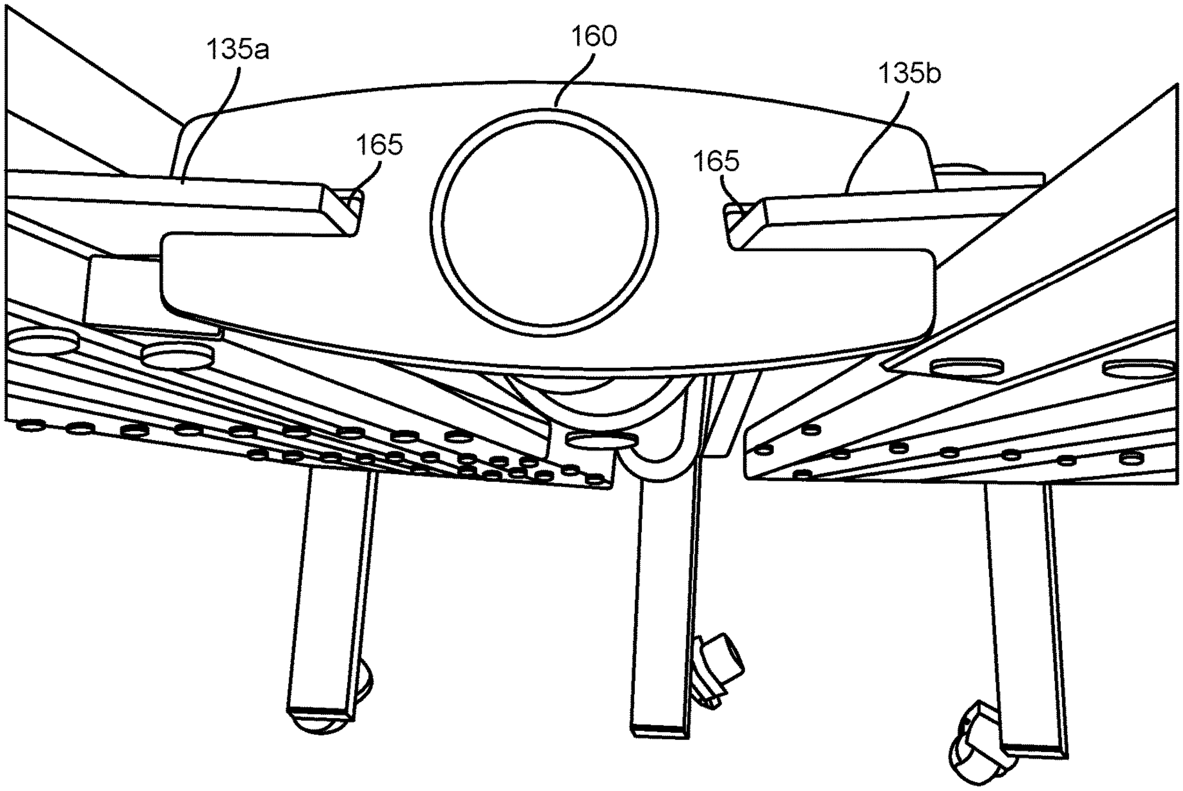
FIG. 13 is a top view of the portion of the barrier of FIG. 1 showing the hinge lock in a second, locked configuration.

Now with respect to FIGS. 6-9, each connector 125 can be a generally tubular structure having a leaf 126 extending outward laterally from a knuckle 127. The leaf 126 of the connector 125 is configured to couple with the expandable section 105, as will be described in more detail below, and the tubular knuckle 127 is configured to couple with the post 130. The inner cylindrical surface of the tubular knuckle 127 has an inner diameter sized to receive an outer diameter of the outer cylindrical surface of the post 130 such that the tubular knuckle 127 can be received over the post 130 and the connectors 125 and the post 130 are coaxially aligned. The tolerance between the inner surface or inner diameter of the tubular knuckle 127 and outer surface or outer diameter of the post 130 is such that the connector 125 is readily pivotable relative to the post 130, but not too loose so as to affect a smooth articulating movement around the axis of rotation A. At least one or both of the connectors 125*a*, 125*b* can be moveably coupled to the post 130 such that at least one or both of the expandable sections 105*a*, 105*b* can rotate about the post 130 forming various articulation angles relative to one another. In some implementations, the tubular knuckle 127 of a first connector 125*a* is fixedly attached to the post 130 such that it does not rotate relative to the post 130 whereas the tubular knuckle 127 of a second connector 125*b* is rotatably attached to the post 130. For example, as shown in FIG. 7, connector 125*b* inserted over the post 130 is configured to rotate relative to the post 130 whereas connector 125*a* inserted over the post 130 is configured to fixedly attach to the post 130 by a bolt 131 or other coupling element such that it does not rotate relative to the post 130. Further, the adjacent edges of the connectors 125 forming each hinge element can incorporate a coating or covering allowing for smooth pivoting movements between them. Alternatively, as best shown in FIGS. 6-7 a washer 134 or other elements between the connectors 125 can be incorporated into the hinge elements for smooth pivoting movements of the expandable sections.

Again with respect to FIGS. 5-9, each of the connectors 125 also include a connection leaf 126 configured to couple with its respective expandable section 105. The connection leaf 126 can be an outwardly-extending planar portion having at least one aperture extending through it. As mentioned previously, each expandable section 105*a*, 105*b* includes a multiplicity of slats 120 that extend between an inner upright 135 and an outer upright 140 (see FIG. 5). The inner upright 135 can be a generally rectangular, planar piece having a first elongate edge oriented towards and moveably coupled to the scissoring slats 120 and a second elongate edge oriented towards the central post 130 and having a plurality of openings 145. When the tubular knuckle 127 of the connector 125 is positioned over the central post 130, the at least one aperture extending through the connection leaf 126 aligns with an opening 145 of the inner upright 135 such that a coupling element 128 can be received therethrough. The coupling element 128 can be a rivet, screw, bolt, or other component configured to clamp the connector 125 to its respective expandable section 105. In some implementations, the connection leaf 126 of the connector 125 is formed by a pair of opposing flanges configured to receive the inner upright 135 therebetween (best shown in FIGS. 8-9). The coupling element 128 extends through a first aperture on a first flange, an opening 145 of the inner upright 135 and a second aperture on the second flange such that the inner upright 135 and connection leaf 126 are coupled together by the coupling element 128. In some implementations, the opposing flanges each have two apertures configured to receive two coupling elements 128.

Now with respect to FIGS. 10-13, the barrier 100 can incorporate a hinge lock 150 such that when the two expandable sections 105*a*, 105*b* are not articulated around the hinge 115 and are each aligned within a single vertical plane, the hinge lock 150 can engage a portion of the inner uprights 135 of each of the sections 105*a*, 105*b* locking them into fixed relative position and preventing articulation around the axis of rotation of the hinge 115. The hinge lock 150 can include a tubular region 155 having an outer diameter configured to insert within the inner diameter from an upper end of the tubular central post 130 and a locking region 160 extending upward from the tubular region 155. The locking region 160 can have first and second slots 165 on opposing lateral side that each extend through the full thickness of the locking region 160 and from the lateral side towards the center of the locking region 160. Each of the slots 165 are wide enough to receive at least a portion of an upper edge of a respective one of the inner uprights 135 of the first and second expandable sections 105*a*, 105*b*. The hinge lock 150 can be fixedly attached to the barrier 100 and slidable between a locked and unlocked position relative to the central hinge 115. Alternatively, the hinge lock 150 can be a removable element. The hinge lock 150, regardless of whether it is removable, is configured to be advanced downward such that tubular region 155 extends into the lumen of the central post 130. The hinge lock 150 can be rotated such that the lateral slots 165 of the locking region 160 align with the upward-extending edges of the inner upright 135. Advancement of the tubular region 155 of the hinge lock 150 downwards into the lumen of the central post 130 results in the inner uprights 135 extending through the lateral slots 165 such that the expandable sections 105 are fixed relative to one another preventing articulation around the central hinge 115 (see FIG. 13). As mentioned, the hinge lock 150 can be a removable feature. A tether 170 can be incorporated on a region of the hinge lock 150 such that when the hinge lock 150 is not in use it can remain associated with the barrier 100 until it is needed again, for example, when no articulation around the hinge 115 is desired and/or when the barrier 100 is being stowed away.

Figure 17:
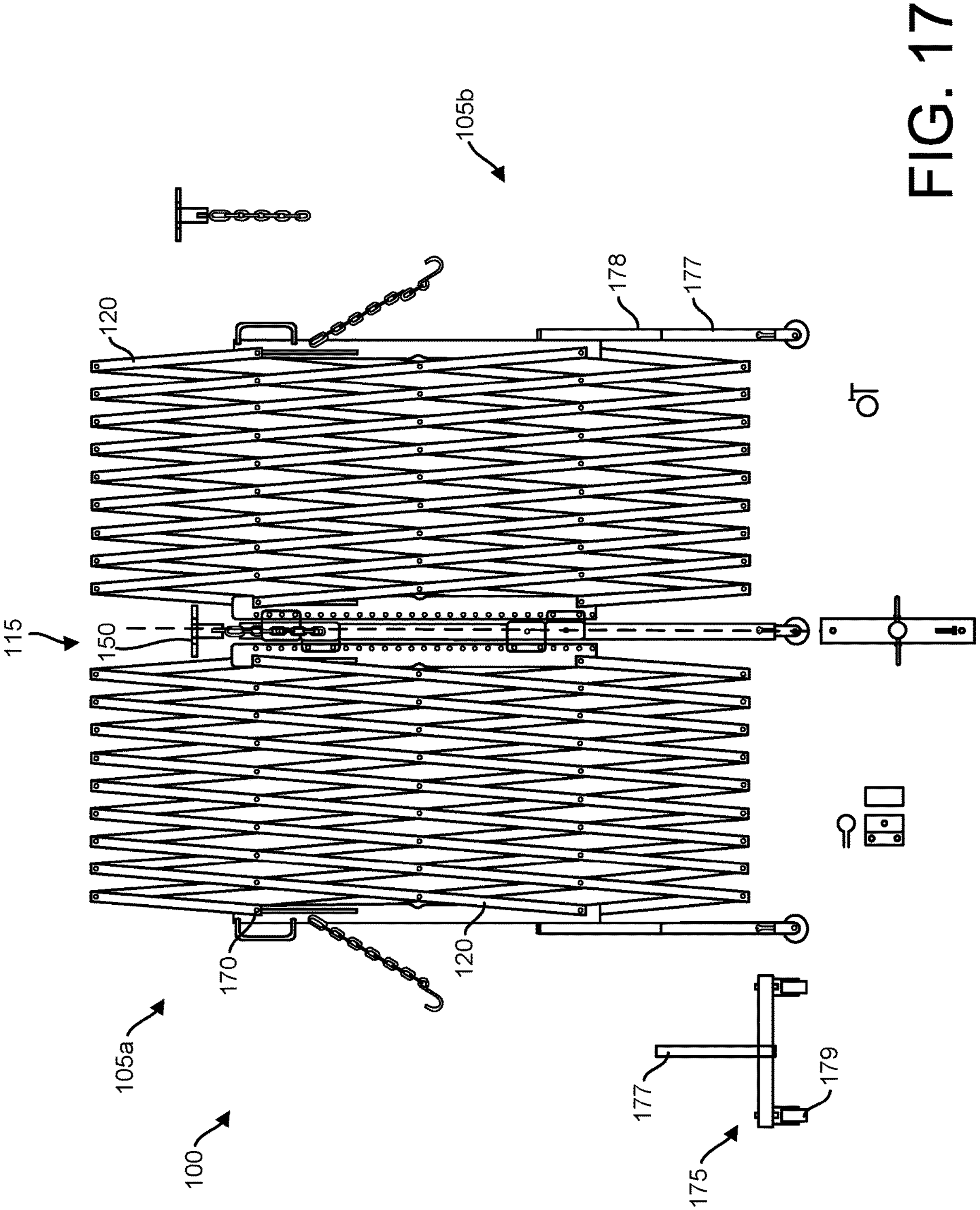
FIG. 17 is a front view of an implementation of a barrier.

As mentioned above, each expandable section 105 includes a multiplicity of slats 120 that extend between the inner upright 135 and the outer upright 140. The inner upright 135 can couple to a first slat pair near a lower end of the first edge by a first coupling 170 and to a second slat pair near an upper end of the first edge by a second coupling 170. The couplings 170 between the slat pairs and the inner upright 135 are configured to undergo scissor action, like the couplings between the slats 120 themselves. The first edge oriented towards the scissoring slats 120 can incorporate an elongated slot (see FIG. 17) near the upper end within which the coupling 170 can be received. This elongated slot allows for the coupling 170 to slide up and down within the slot depending on expansion of the expandable section 105 such that when the expandable section 105 is in the narrow configuration, the coupling 170 is positioned at an upper end of the slot and when the expandable section 105 is in the wide configuration, the coupling 170 slides down away from the upper end of the slot near a lower end of the slot. A mechanism can be incorporated to limit expansion, such as a bolt or other feature. Further, the couplings described herein can vary including, but not limited to bolts, screws, pins or other mechanisms.

Again with respect to FIG. 5, the outer upright 140 can be a generally elongate element coupled to a first slat pair near a lower end by a first coupling 170 and to a second slat pair near an upper end by a second coupling 170. The couplings 170 between the slat pairs and the outer upright 140 are configured to undergo scissor action. The outer upright 140 can provide a surface for a user to grasp the expandable section 105 without risk of pinching their fingers when the sections 105 are expanded. Additionally, the outer upright 140 can incorporate one or more handle elements (see FIG. 1) to aid in grasping and/or expanding the sections 105 of the barrier 100.

Figure 2:
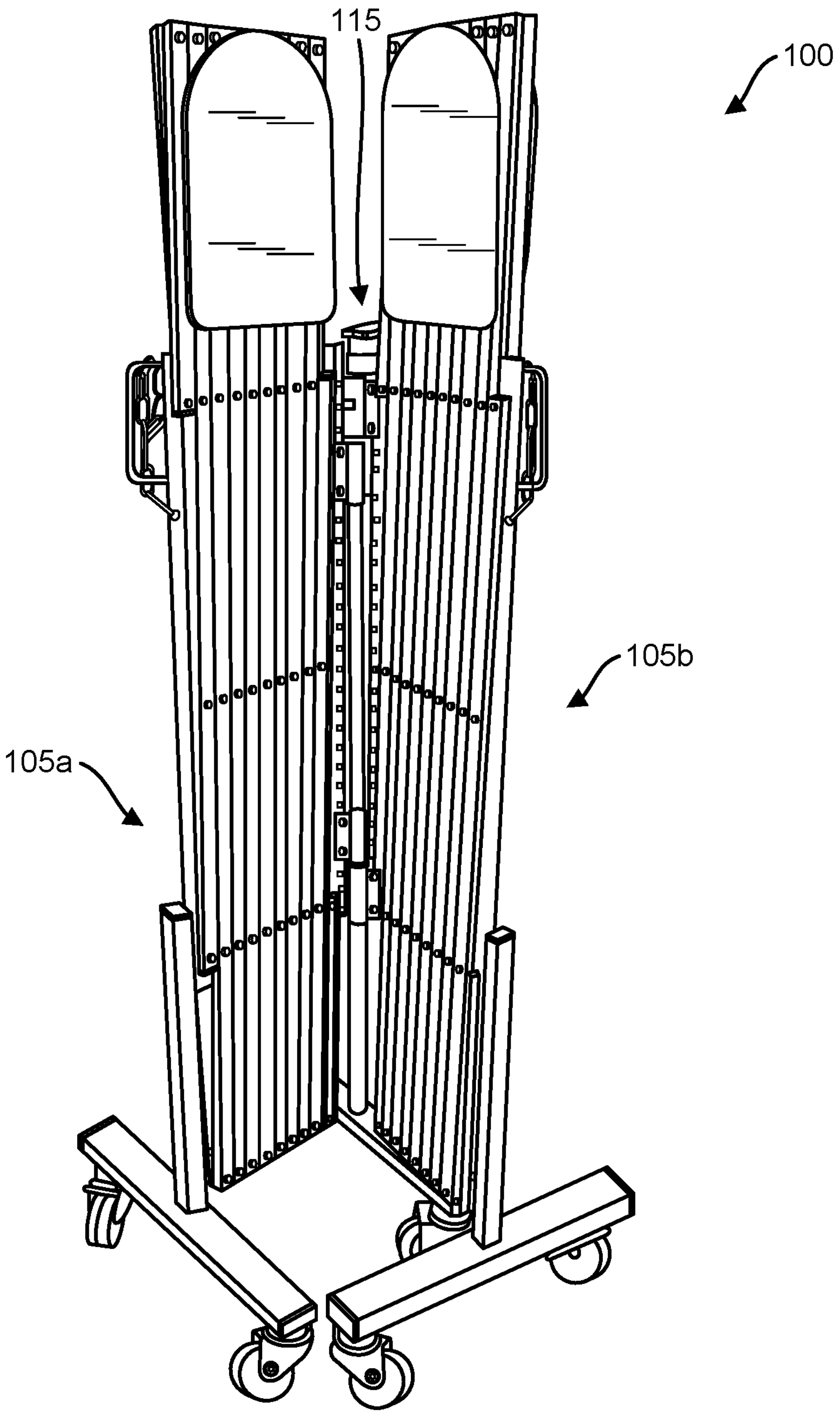
FIG. 2 is a view of a first side of the barrier of FIG. 1 in a collapsed, articulated configuration.
Figure 3:
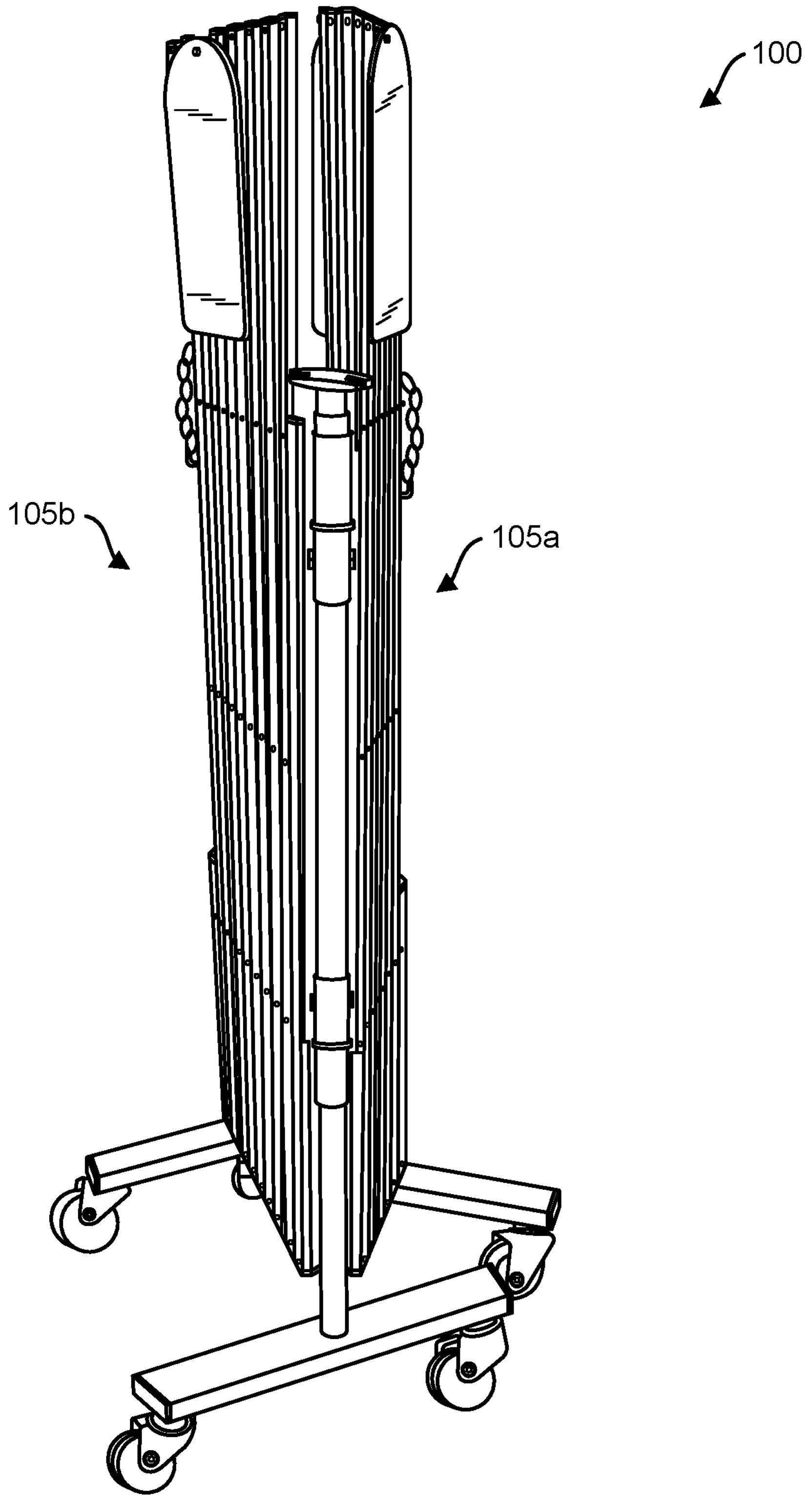
FIG. 3 is a view of a second side of the barrier of FIG. 1 in a collapsed, articulated configuration.
Figure 4:
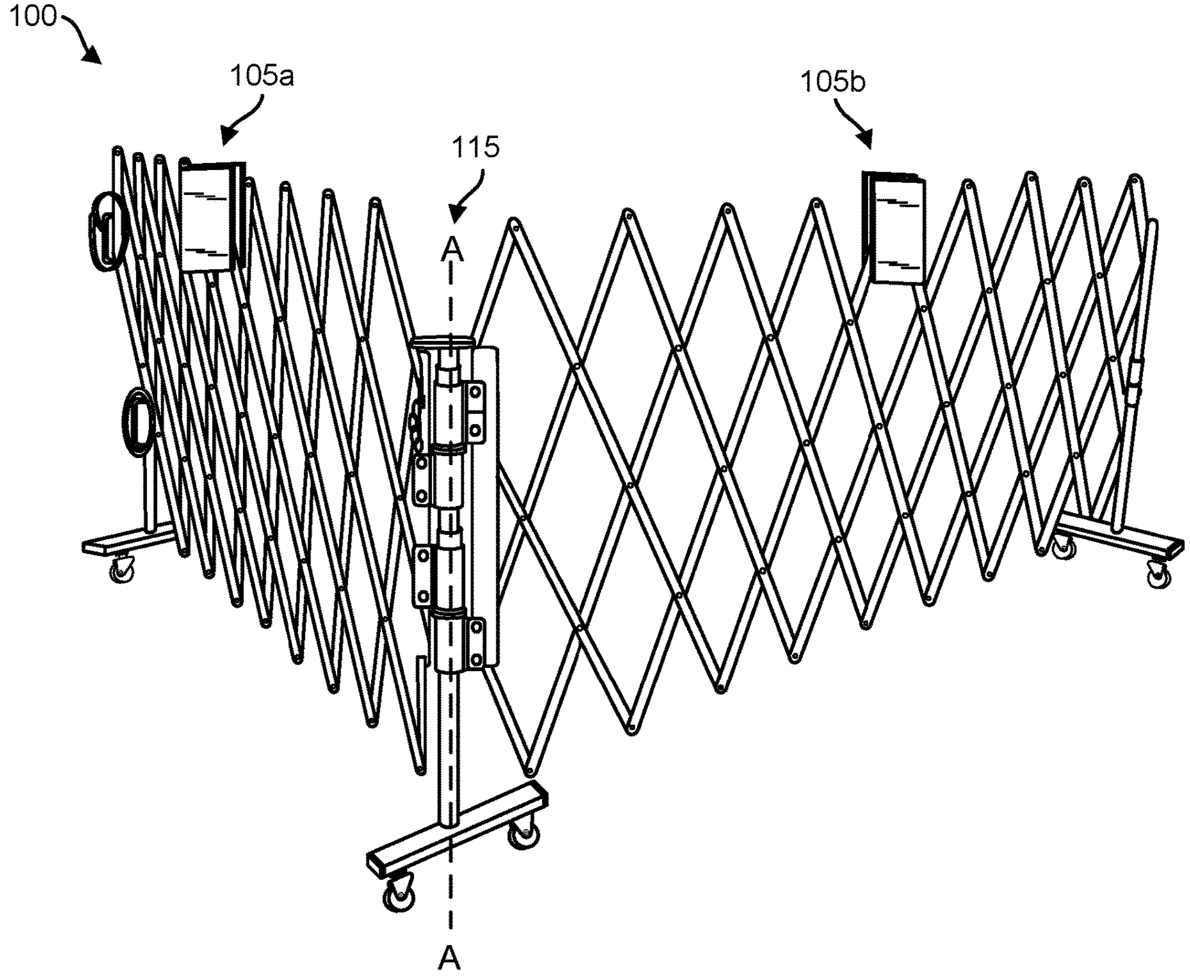
FIG. 4 is a view of the barrier of FIG. 1 in an expanded, articulated configuration.
Figure 14:
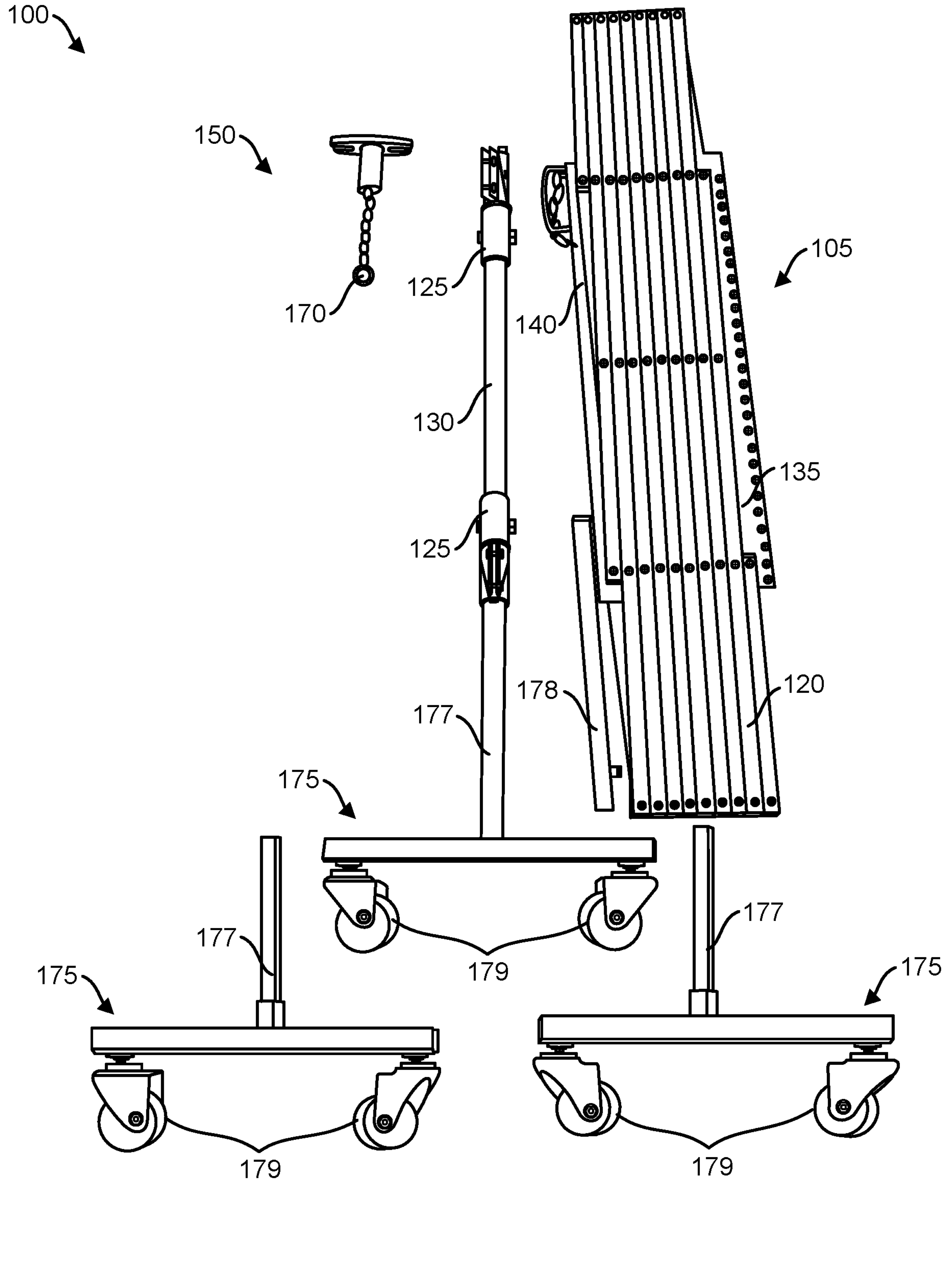
FIG. 14 is an exploded view of the barrier of FIG. 1.

The barrier 100 can be a free-standing barrier. In some implementations, a base or footing 175 can be coupled to lower ends of the expandable sections such as each of the outer uprights 140 to support the barrier and prevent it from tipping during use. A footing 175 can also be coupled to a lower end of the central post 130. The footing 175 can be removably or permanently coupled to the lower end of the outer uprights 104 and post 130. A rod 177 of the footing 175 can extend upwardly into a correspondingly-shaped receiver element 178 near a lower end region of the outer uprights 140 or a lower end region of the central post 130. The footing 175 can be a generally t-shaped element as shown in FIG. 14 to provide a low-profile configuration to the barrier 100 when folded up as shown in FIGS. 2 and 3, however it should be appreciated that other stable configurations are considered herein. The footing 175 can incorporate casters 179 to provide ease of movement of the expandable sections 105, for example during expansion of the sections 105 as well as the pivoting of the sections 105 relative to one another along any of a variety of angles (see FIG. 4).

When the barrier 100 is folded into a storage configuration, the angle achieved between the two expandable sections 105*a*, 105*b* for storage can be between about 0 degrees (i.e. folded over onto each other completely), about 10 degrees, about 20 degrees, about 30 degrees, about 40 degrees, about 45 degrees, up to under 180 degrees (i.e. unfolded), as well as any other degree angle in between. Further, the angle achieved between the two expandable sections 105*a*, 105*b* during use can be between about 0 degrees (i.e. folded over onto each other completely), 45 degrees, 90 degrees, 180 degrees (i.e. unfolded), 270 degrees, approaching 360 degrees (i.e. folded over onto each other completely in the opposite direction), as well as any other degree angle in between. The angle achieved by articulating the expandable sections 105*a*, 105*b* relative to one another allows for the barrier 100 to be used to enclose a variety of geometrically shaped areas depending on how many expandable sections 105 are connected together by the hinge 115. If such a barrier 100 is used in an aisle of a retail store, the aisle can be completely blocked if the barrier sections 105 are extended across the aisle and no relative articulation achieved. The barrier 100 can also be used to block only a portion of the width of the aisle, for example, by articulating one of the sections 90 degrees relative to the other. In a further implementation, three expandable sections 105 are coupled together by hinges 115 such that a triangularly-shaped region can be enclosed. In other implementations, more than three expandable sections 105 are coupled together by hinges 115 such that other geometrically-shaped regions can be enclosed or barricaded.

Figure 15:
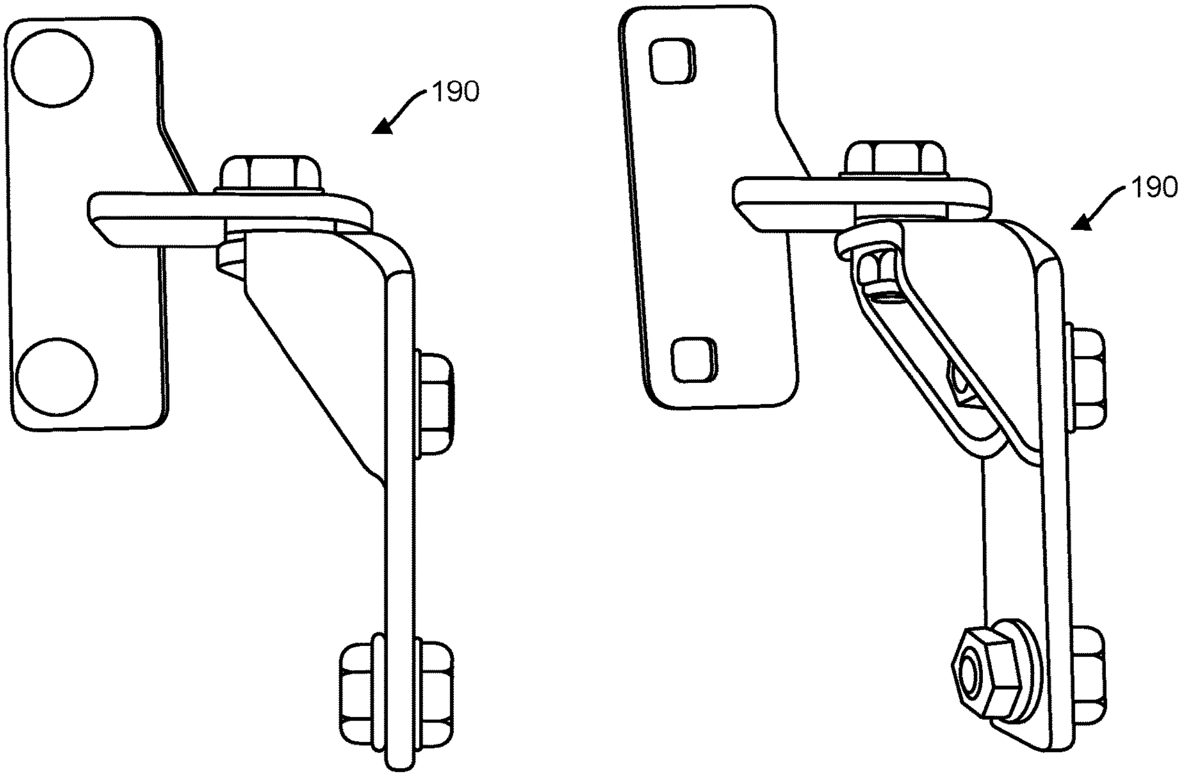
FIGS. 15-16 are perspective views of a connector for use with the barrier of FIG. 1.
Figure 16:
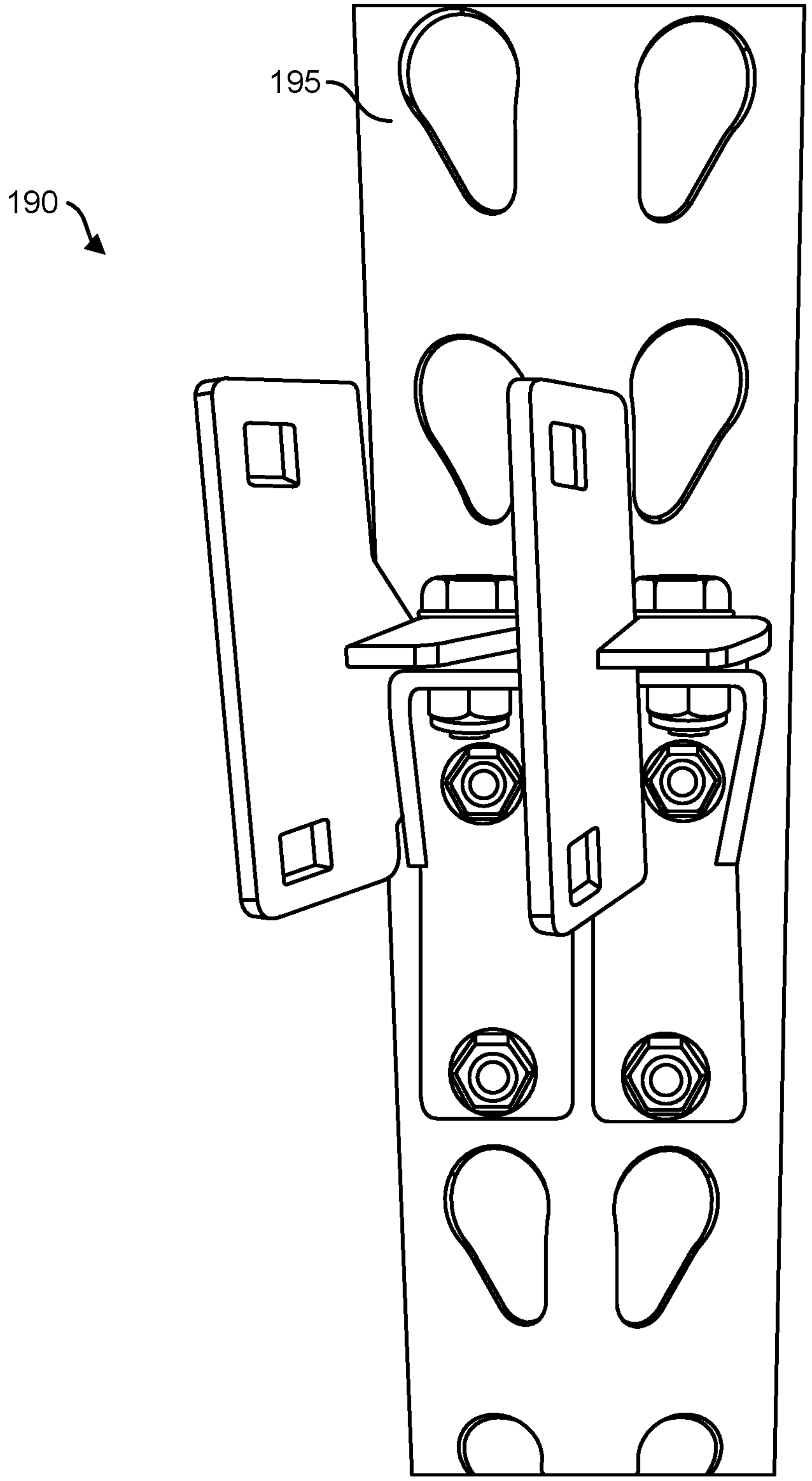

As mentioned above, the barrier 100 can be a completely free-standing barrier or it can be attached and supported on at least a first end to another structure. For example, a first expandable section 105*a* can be coupled to a wall, entryway, or other feature where the barrier 100 is intended to be used and a second expandable section 105*b* can be free-standing such that it incorporates a footing 175. Further, in this implementation, the central post 130 can also incorporate a footing 175. FIGS. 15 and 16 illustrate an implementation of a connector 190 for attached an outer upright 140 to a bracket 195 or other similar element located in the environment within which the barrier 100 is to be used. The configuration of connector 190 can vary and this represents one example. Similarly, it should be appreciated that the environment that the barrier 100 is to be used can vary such that the bracket 195 can be affixed to a wall, doorframe, shelving, or other feature.

The barriers described herein can incorporate any of a number of user-friendly features including one or more signs, chains and/or padlocks to maintain the collapsed configuration of the barrier 100 when not in use.

While this specification contains many specifics, these should not be construed as limitations on the scope of what is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together."

Use of the term "based on," above and in the claims is intended to mean, "based at least in part on," such that an unrecited feature or element is also permissible.

The invention claimed is:

1. An adjustable barrier comprising:

an inner upright comprising a plurality of openings extending through a thickness of the inner upright that are spaced along a vertical length of the inner upright;

a cylindrical post;

at least a first connector comprising an inner connecting portion and an outer connecting portion, the inner connecting portion sized to receive the cylindrical post so as to rotate relative to the cylindrical post around an axis of rotation, and the outer connecting portion adapted to removably couple to the inner upright by engaging at least one opening of the plurality of openings;

an outer upright;

at least a first expandable section coupled to the inner upright on a first side and the outer upright on a second side, wherein the first expandable section further comprises a first multiplicity of slats extending between the inner upright and the outer upright, the first multiplicity of slats hingedly interconnected in a scissoring lattice-type structure configured to expand outward from a compact, collapsed narrow configuration to an expanded, wide configuration; and a footing slideably coupled to a lower end region of the outer upright that is adjustable relative to the barrier.

2. The barrier of claim 1, wherein the footing comprises a rod extending upwardly and configured to be received into a correspondingly-shaped receiver element near the lower end region of the outer upright.

3. The barrier of claim 1, wherein the footing incorporates casters.

4. The barrier of claim 1, further comprising at least one handle coupled to the outer upright and configured to be grasped.

5. The barrier of claim 1, wherein the post incorporates a second footing coupled to a lower end of the post.

6. The barrier of claim 5, wherein the second footing incorporates casters.

7. The barrier of claim 1, further comprising a second expandable section coupled to a second inner upright, the second inner upright coupled to the post by at least a second connector comprising an outer connecting portion and an inner connecting portion, the outer connecting portion of the second connector adapted to couple to at least one opening of a plurality of openings spaced along a vertical length of the second inner upright, the inner connecting portion of the second connector sized to receive the cylindrical post.

8. The barrier of claim 7, wherein both the first and second expandable sections are movably coupled to the post in order to articulate around the axis of rotation forming an articulation angle between the first and second expandable sections.

9. The barrier of claim 8, wherein the articulation angle is between 0 degrees at which the first and second expandable sections is folded over completely against one another to about 180 degrees at which the first and second expandable sections are unfolded relative to one another and extend within a single vertical plane.

10. The barrier of claim 1, wherein the inner connecting portion of the first connector comprises a tubular knuckle and the outer connecting portion of the first connector comprises a pair of opposing flanges extending laterally outward from the tubular knuckle, wherein the tubular knuckle has an inner diameter sized to receive an outer diameter of the post and the pair of opposing flanges are configured to couple to the inner upright.

11. The barrier of claim 10, wherein, when the post extends through the inner diameter of the tubular knuckle, the inner upright is positioned between the pair of opposing flanges.

12. The barrier of claim 11, wherein each of the pair of opposing flanges includes a first aperture, wherein the first aperture of the pair of opposing flanges is configured to align with any one of the plurality of openings.

13. The barrier of claim 12, wherein when the first aperture of the pair of opposing flanges aligns with one opening of the plurality of openings on the inner upright a bore is formed that is configured to receive a coupling element.

14. The barrier of claim 13, wherein the coupling element is removably received within the bore.

15. The barrier of claim 1, further comprising a hinge lock attached to the barrier and slideable between a locked position and an unlocked position.

16. An adjustable barrier comprising:
- an inner upright;
- an outer upright;
- a post coupled to the inner upright;
- a first expandable section coupled to the post by at least a first connector on a first side and the outer upright on a second side, wherein the first expandable section further comprises a first multiplicity of slats extending between the inner upright and the outer upright, the first multiplicity of slats hingedly interconnected in a scissoring lattice-type structure configured to expand outward from a compact, collapsed narrow configuration to an expanded, wide configuration;
- a second expandable section coupled to the post by at least a second connector forming a central hinge between the first expandable section and the second expandable section, the central hinge having an axis of rotation,
  - wherein the first connector and the second connector each comprises a tubular knuckle and a pair of opposing flanges extending laterally outward from the tubular knuckle, wherein the tubular knuckle has an inner diameter sized to receive an outer diameter of the post and the pair of opposing flanges are configured to couple to a respective one of the first and second expandable sections,
  - wherein, when the post extends through the inner diameter of the tubular knuckle, the inner upright of the respective expandable section is positioned between the pair of opposing flanges, wherein the inner upright of the respective expandable section comprises a plurality of openings extending through its thickness that are spaced along a vertical length of the inner upright; and
- a footing slideably coupled to a lower end region of the outer upright, wherein the footing comprises a rod extending upwardly and configured to be received into a correspondingly-shaped receiver element near the lower end region of the outer upright.

* * * * *